United States Patent Office 3,123,615
Patented Mar. 3, 1964

3,123,615
5-[α,β-BIS(OXYPHENYL)ETHYL]1H-TETRAZOLES
Kurt J. Rorig, Glenview, Ill., assignor to G. D. Searle & Co., Chicago, Ill., a corporation of Delaware
No Drawing. Filed Sept. 25, 1962, Ser. No. 226,160
4 Claims. (Cl. 260—308)

This invention relates to 5-[bis(oxyphenyl)alkyl]-1H-tetrazoles and processes for the manufacture thereof. More particularly, this invention provides novel, useful chemical compounds of the formula

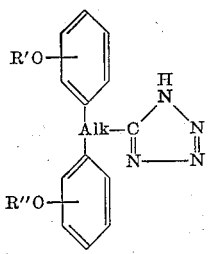

wherein Alk represents an alkyl radical substituted on the same or different carbon atoms thereof by oxyphenyl radicals as shown, and R′ and R″ each represent hydrogen or an alkyl radical. Among the alkyl radicals contemplated, especially lower alkyl radicals are preferred, which is to say methyl, ethyl, propyl, isopropyl, butyl, isobutyl, sec-butyl, tert-butyl, pentyl, neopentyl, hexyl, heptyl, and like —$C_nH_{2n+1}$ groupings wherein $n$ represents a positive integer less than 8. Positioning of the constituents represented by R′O and R″O about the benzene rings is not critical, though para positioning is the attachment of choice.

The compounds to which this invention relates are useful by reason of their valuable pharmacological properties. Thus, for example, they stimulate the central nervous system, induce hypocholesterolemia, block the effect of desoxycorticosterone acetate on urinary sodium and potassium, and are anti-biotic agents variously effective against bacteria such as *Diplococcus pneumoniae*, algae such as *Chlorella vulgaris*, and fungi such as *Trichophyton mentagrophytes*.

Manufacture of the compounds hereof proceeds by heating a nitrile of the formula

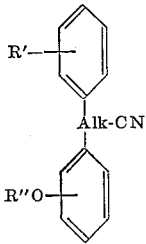

wherein Alk, R′, and R″ have the same meanings as before, with the elements of ammonium azide in an inert solvent such as dimethylformamide, and subsequently acidifying.

Equivalent to the enformulated tetrazoles for the purposes of this invention are the corresponding ammonium, alkali metal, and alkaline earth salts derived on contact with the apposite hydroxides.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

*5-[α,β-Bis(p-Methoxyphenyl)Ethyl]-1H-Tetrazole*

A mixture of 53 parts of 2,3-bis(p-methoxyphenyl)-propionitrile, 14 parts of sodium azide, 2 parts of ammonium chloride, and 100 parts of dimethylformamide is heated at 140–145° with agitation for 10 hours, then evaporated to dryness by vacuum distillation at around 95°. The residue is triturated with 250 parts of water and sufficient hydrochloric acid to bring the pH to 2, whereupon it is washed with 250 parts of hot benzene. Recrystallization from methanol affords 5-[α,β-bis(p-methoxyphenyl)ethyl]-1H-tetrazole melting at approximately 187–188°, the formula of which is

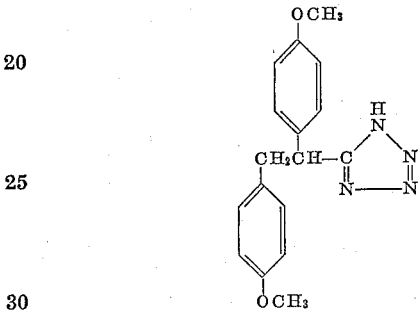

EXAMPLE 2

A. *2,3-Bis(p-Ethoxyphenyl)Acrylonitrile*

To a solution of 54 parts of sodium methoxide in 800 parts of methanol is added 150 parts of p-ethoxybenzaldehyde and 161 parts of p-ethoxyphenylacetonitrile. The resultant mixture is heated at 50° for 5 minutes, then chilled. The pale yellow crystalline solids present are filtered off and dried in air. The material thus isolated is 2,3-bis(p-ethoxyphenyl)acrylonitrile.

B. *2,3-Bis(p-Ethoxyphenyl)Propionitrile*

A solution of 293 parts of 2,3-bis(p-ethoxyphenyl)-acrylonitrile in 1600 parts of freshly-distilled acetone is heated to the boiling point, mixed thereat with 200 parts of Raney nickel, and filtered. The filtrate is mixed with 50 parts of 5% palladium-on-charcoal catalyst and hydrogenated under 80 pounds of pressure during 45 minutes. Catalyst is filtered out, and the filtrate is stripped of solvent by vacuum distillation. The white crystalline residue is the desired 2,3-bis(p-ethoxyphenyl)propionitrile.

C. *5-[α,β-Bis(p-Ethoxyphenyl)Ethyl]-1H-Tetrazole*

Substitution of 58 parts of 2,3-bis(p-ethoxyphenyl)-propionitrile for the 2,3-bis(p-methoxyphenyl)propionitrile called for in Example 1 affords, by the procedure there detailed, 5-[α,β-bis(p-ethoxyphenyl)ethyl]-1H-tetrazole, having the formula

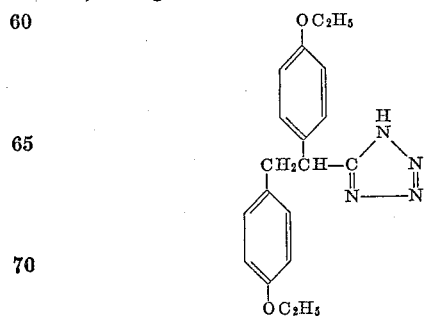

EXAMPLE 3

5-[α,β-Bis(p-Hydroxyphenyl)Ethyl]-1H-Tetrazole

A mixture of 48 parts of 2,3-bis(p-hydroxyphenyl)-propionitrile, 14 parts of sodium azide, 2 parts of ammonium chloride, and 100 parts of dimethylformamide is heated at the boiling point under reflux for 17 hours, then stripped of solvent by vacuum distillation at approximately 90°. The residual oil is mixed with 300 parts of water and acidified to pH 2. The resultant mixture is stirred vigorously while warming gently, then cooled till solidification of the constituent oil occurs. The solid product is filtered off and taken up in 2000 parts of aqueous 4% sodium bicarbonate. The bicarbonate solution is filtered and acidified with hydrochloric acid. The ivory solids thrown down are filtered off and dried in air. The 5-[α,β-bis(p-hydroxyphenyl)ethyl]-1H-tetrazole thus isolated melts at approximately 220.5–221.5°. It has the formula

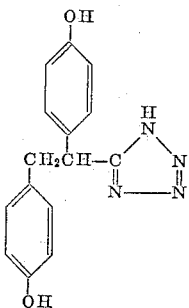

What is claimed is:
1. A compound of the formula

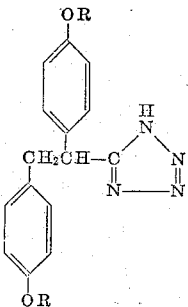

wherein R represents a member of the group consisting of hydrogen and lower alkyl radicals.
2. 5-[α,β-bis(p-methoxyphenyl)ethyl]-1H-tetrazole.
3. 5-[α,β-bis(p-ethoxyphenyl)ethyl]-1H-tetrazole.
4. 5-[α,β-bis(p-hydroxyphenyl)ethyl]-1H-tetrazole.

No references cited.

UNITED STATES PATENT OFFICE
CERTIFICATE OF CORRECTION

Patent No. 3,123,615            March 3, 1964

Kurt J. Rorig

It is hereby certified that error appears in the above numbered patent requiring correction and that the said Letters Patent should read as corrected below.

In the heading to the printed specification, line 2, title of invention, for "5-[α,β-BIS(OXYPHENYL)ETHYL]1H-TETRAZOLES" read -- 5-[α,β-BIS(p-OXYPHENYL)ETHYL]-1H-TETRAZOLES --; column 1, lines 45 to 55, the formula should appear as shown below instead of as in the patent:

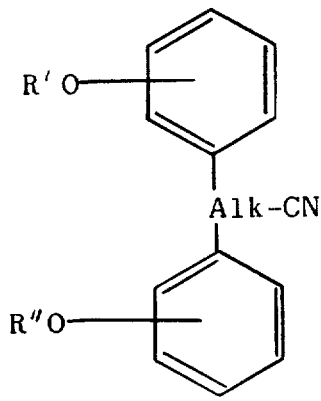

Signed and sealed this 11th day of August 1964.

(SEAL)
Attest:

ERNEST W. SWIDER            EDWARD J. BRENNER
Attesting Officer            Commissioner of Patents